J. COOK.
ELECTRIC CLOCK.
APPLICATION FILED FEB. 2, 1915.
1,186,886.
Patented June 13, 1916.
2 SHEETS—SHEET 1.
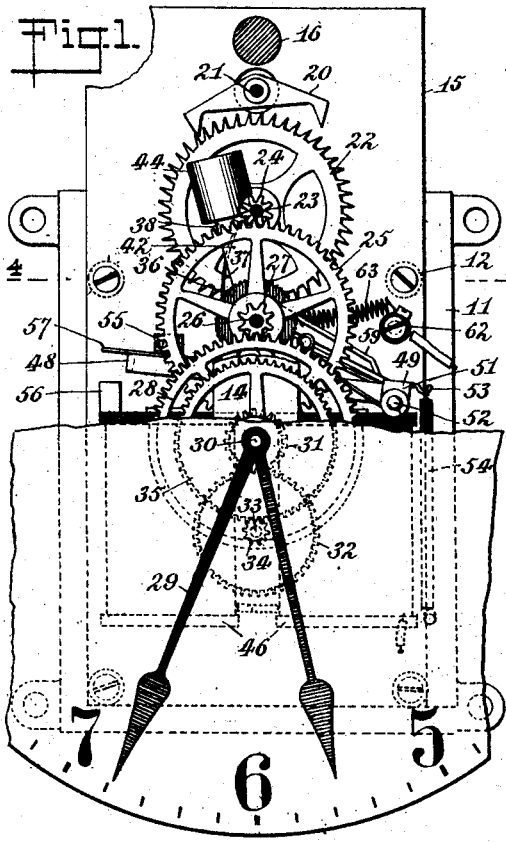
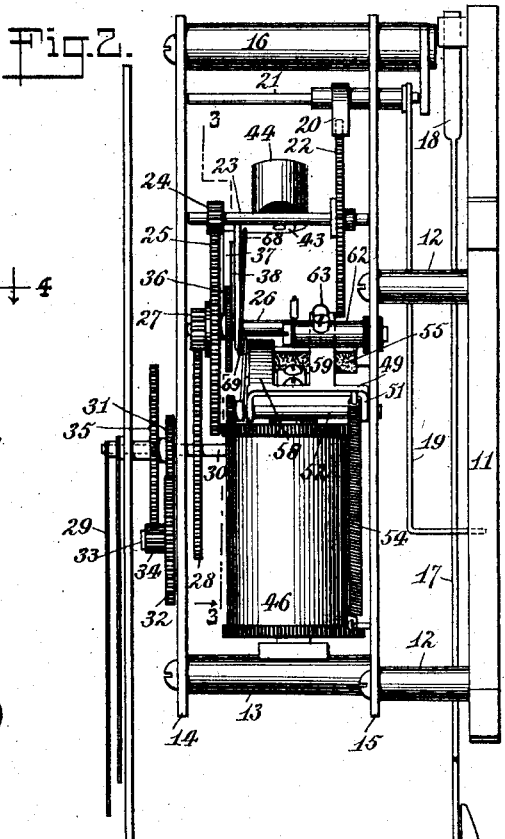
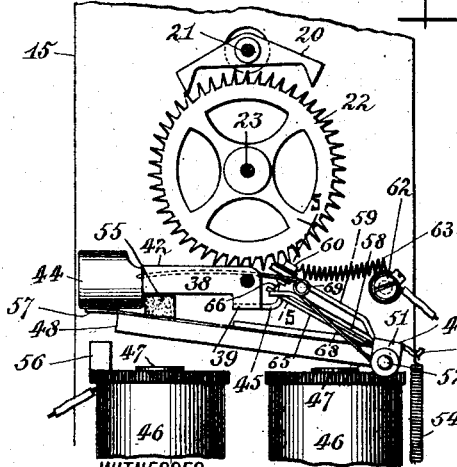
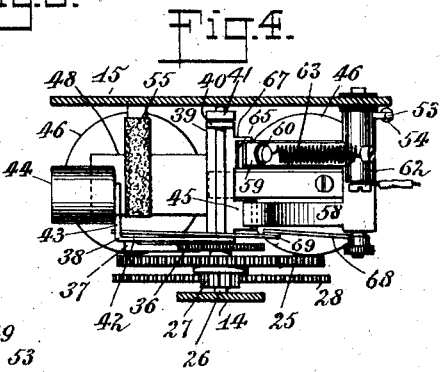
WITNESSES
INVENTOR
John Cook
BY George Cook
ATTORNEY J. COOK.
ELECTRIC CLOCK.
APPLICATION FILED FEB. 2, 1915.
1,186,886.
Patented June 13, 1916.
2 SHEETS—SHEET 2.
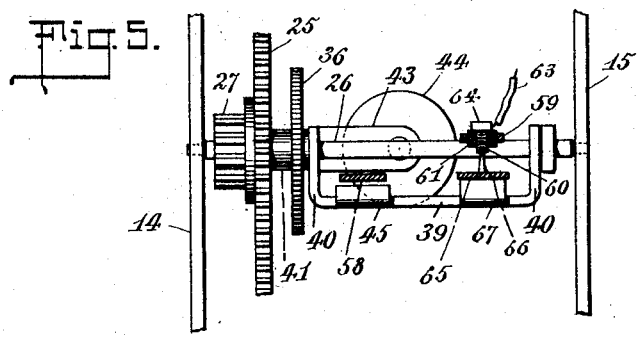
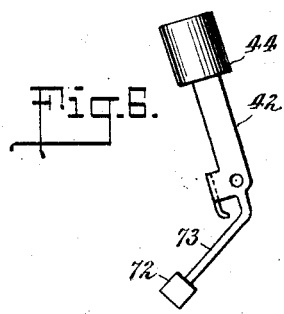
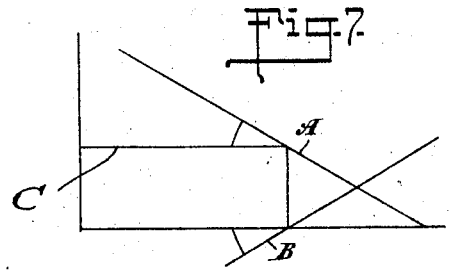
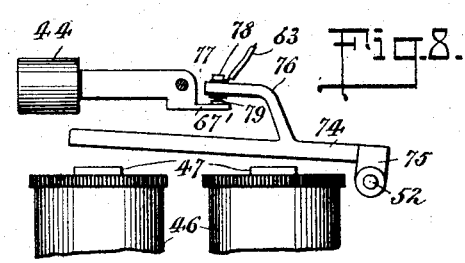
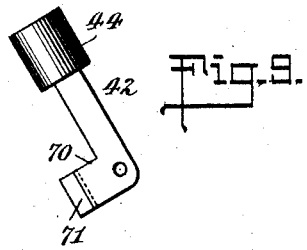
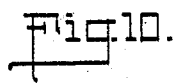
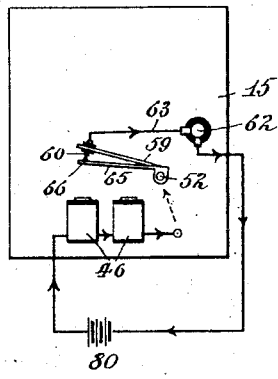
WITNESSES
INVENTOR
John Cook.
BY George Cook
ATTORNEY

UNITED STATES PATENT OFFICE.

JOHN COOK, OF ALLENDALE, NEW JERSEY.

ELECTRIC CLOCK.

1,186,886.  Specification of Letters Patent.  Patented June 13, 1916.

Application filed February 2, 1915. Serial No. 5,620.

*To all whom it may concern:*

Be it known that I, JOHN COOK, a citizen of the United States, and a resident of Allendale, in the county of Bergen and State of New Jersey, have made and invented certain new and useful Improvements in Electric Clocks, of which the following is a specification.

This invention relates to an electric clock and more particularly to that class of time keeping mechanism wherein an electric-magnet is intermittently operated for the elevation of a weight, whose lowering is utilized for the actuation of the clock.

An object of the present invention is to provide a time keeping mechanism of such design and arrangement that it may be driven from dry cells, the energy of which is economically consumed, whereby a single set of cells are adapted to continuously operate the clock for a considerable length of time, depending rather upon the normal deterioration of the batteries rather than the consumption of the parts which constitute the same.

A further object is to provide an electrically driven clock wherein the electric circuits and driving mechanism are so arranged that the electric energy is momentarily applied at intervals of between one and two minutes, thus providing a period of rest for the battery between each withdrawal of energy, whereby a consumption of parts and polarization of the battery is reduced to a minimum.

A further object is to provide a weight driven clock, wherein suitable means are provided so that a substantially uniform turning moment will be produced by the weight regardless of its position throughout its range of movement, allowing the clock to accurately operate in positions other than the precise vertical.

A further object is to provide a novel circuit closing device and coöperating mechanism for automatically energizing electromagnets and the raising of a suitable clock driving weight.

A further object is to accomplish the afore-mentioned ends in an expeditious and economical manner, and with these and other objects in view, the invention resides in the combination and arrangement of parts, and in the details of construction hereinafter described and claimed, it being understood that changes in the precise embodiment of the invention can be made within the scope of what is claimed without departing from the spirit of the invention.

The preferred embodiment of my invention is disclosed in the accompanying drawings, wherein:—

Figure 1 is a view in front elevation of the electric clock, a portion only of the dial being illustrated, as the invention is primarily concerned with the time keeping mechanism *per se;* Fig. 2 is a view in side elevation of the foregoing; Fig. 3 is a fragmental view in section taken on the line 3—3 of Fig. 2; Fig. 4 is a sectional view taken on the line 4—4 of Fig. 1; Fig. 5 is a detail view in section taken on the line 5—5 of Fig. 3, and illustrating the circuit closing mechanism; Fig. 6 is a detail view of the actuating weight whose successive lowerings result in the continuous actuation of the clock; Fig. 7 is a diagrammatic view representing in a general manner the substantially constant turning moment applied by the compound weights; Fig. 8 is a detail view of a somewhat modified form of armature and circuit closing mechanism; Fig. 9 is a view in side elevation of a somewhat modified form of weight wherein the carriage is enlarged so as to supply a counterbalancing effect resulting in a substantially uniform turning moment applied by the weight regardless of its position, within the limits of its movement. Fig. 10 is a diagrammatic view of the electric circuits involved.

Referring to the drawings wherein similar reference numerals designate corresponding parts throughout, a base 11 is provided with the outstanding posts 12 to which is secured a frame 13. The frame 13 is arranged to support the various arbors and shafts which go to make up the works of the clock, and includes the space plates 14—15 which are maintained in such relation by the columns 16.

The clock is provided with a pendulum 17, secured at its upper extremity 18, to the base 11 and engages the forked pendulum lever 19, so as to be oscillated thereby and providing for the periodical oscillation of the pallet or escapement lever 20, the latter being mounted upon the arbor 21, to which the pendulum lever 19 is also secured. Coacting with the escapement lever or pallet 20 is the escape wheel 22 carried by the shaft or arbor 23 upon which is also mounted the pinion 24. The gear train of the clock mechanism further includes the gear wheel 25 meshing with and driving the pinion 24 as will be presently explained. The arbor 26, upon which the gear 25 is mounted, also supports the pinion 27, which meshes with the gear 28 which drives the minute hand 29 of the clock, the minute hand and gear 28 being supported by the arbor 30. The arbor 30 also carries the pinion 31, meshing with the gear 32, which latter is carried by a trunnion 33 which is secured to the front plate 14 of the clock frame. The gear wheel 33 supports the pinion 34 with which meshes the hour hand gear 35, whereby the proper relative gear ratio will be had between the minute and hour hand. The various arbors are supported in suitable bearings located within the front and back plates 14—15 of the clock frame, and being of the conventional form, are not illustrated.

A ratchet wheel 36 is rigidly secured to and mounted upon the arbor 26 and is engaged by the spring pawl 37, with which the weight carrying carriage 38 is provided. The carriage 38 includes the base plate 39, which is provided with the spaced upturned sides 40, through which the arbor 26 projects and with which it effects a rotatable connection. The spaced sides 40 of the carriage are so arranged as to contact with the ratchet wheel 36, and with a collar 41 mounted upon the arbor 26, whereby the carriage is prevented from lateral shifting. A weight carrying lever 42 projects from one of the sides 40 of the carriage and is provided with the terminal end 43, to which the actuating weight 44 is rigidly secured. The weight is located a distance from the arbor 26 and is therefore adapted to exert a turning moment thereon by means of the carriage pawl 38 and the ratchet wheel 36 with which it engages. The ratchet wheel and pawl are so arranged that the weight may be forcibly raised without rotating the ratchet wheel, but as soon as the weight reaches its uppermost position and the elevating force has been removed, the pawl, engaging the ratchet wheel, will exert a turning moment upon the arbor 26 whereby the escapement mechanism will be operated for the periodical oscillation of the pendulum and the chronological progression of the clock hands.

Extending from the base plate 39 of the weight carrying carriage is the lug 45 which projects to the opposite side of the arbor 26 with relation to the position of the actuating weight 44. Mounted therebelow and carried by the clock frame are the electromagnets 46, whose cores 47 protrude above the body portion thereof, so as to exert a force upon an armature 48, which is located thereabove and rigidly secured to a bracket 49. The bracket 49 includes the downwardly extending arms 51, provided with suitable openings through which a post 52 extends and by means of which the bracket and armature is mounted for pivotal motion. The bracket 49 is provided with the rearwardly extending hook 53, to which a tension spring 54 is secured, whereby the armature will be normally held in a raised position and spaced above the electro-magnets 46. A stop 55 is carried by the clock frame and is formed of some resilient or soft material whereby a cushioning effect will be obtained as the magnets are deënergized and the spring 54 returns the armature to its normal position. In order to prevent the armature from actually contacting with the cores 47 of the electro-magnet which would interfere with the proper return of the armature due to the residual magnetism therein, the abutment or stop block 56 is provided and co-acts with a plate 57 carried by the armature whereby the armature when in its lowermost position, is prevented from actually contacting with the cores of the magnet. The armature carrying member or bracket 49 is provided with the spring arm 58, which extends above the armature and is so positioned as to engage the lug 45 of the weight carrying carriage and exert a turning moment thereon upon the energization of the magnets, resulting in the elevation of the weight.

An electric switch is provided so as to automatically close the circuit including the electro-magnets when the weight 44 has reached its lowermost position, and in order to expeditiously effect the same, the member 49 is provided with a contact point carrying arm 59, to which the adjustable contact point 60 is secured and insulated therefrom by the block of insulating material 61. The contact point or member 60 partakes of the nature of a screw threadedly engaging the block of insulated material through which it projects whereby a certain range of adjustment is had controlling the time or phase of the closing of the electric circuit which includes the electro-magnets. An insulated binding post or terminal 62 is carried by the plate 15, of the clock frame, and has secured thereto one end of a wire coil 63, the other end being connected to a small collar 64, which is carried by, and effects an electrical connection with the contact member 60. Mounted directly below the arm 59 is the spring arm 65, which is provided with the contact point 66, preferably formed of platinum which is adapted to contact with the similar point carried by the contact member 60. The spring arm 65 is secured to the armature carrying member or bracket 49 and is adapted to contact with a lip 67, projecting from the weight carrying carriage in a direction similar to that of the lug 45.

One of the terminals of the electric magnet is connected to a suitable supply of electric energy, illustrated as batteries 80. The other terminal of the electro-magnet is grounded, and therefore in electrical connection with the contact point 66 of the spring arm. The remote terminal of the battery is connected to the binding post 62, so that as the weight 44 rotates, the lug 67 will be raised until it contacts with and raises the spring arm 65, whereby the contact point 66 will be brought into electrical connection with the insulated contact member 60, thus closing the electric circuit which includes the electro-magnets, whereby the latter will be energized and forcibly attract the armature 48. The attraction of the armature and its forced lowering result in the raising of the weight 44 and at the same time instantaneously breaks the electric circuit resulting in the economical consumption of the electrical energy. The forced lowering or attraction of the armature brings the arm 58 into contact with the lug 45, lowering the latter, and in so doing, raises or elevates the weight 44, whereby it is brought into position, suitable for the further actuation of the clock train mechanism. In this manner, the weight is successively raised and allowed to lower, whereby the clock is maintained in continuous operation, the winding taking place at intervals of about 90 seconds. The range of movement of the weight is controlled by the screw contact member 60, which brings it closer to or removes it a greater distance from the second contact point 66. Inasmuch as it is essential that the range of movement of the weight 44 and the carrying arm move through an arc of considerable extent, it will be apparent that the turning moment exerted upon the arbor 26 through the intervention of the ratchet wheel and pawl will vary considerably according to the position of the weight. In order to overcome this, a spring 68 is secured to the weight 44, and is secured at its opposite end to the extremity of the post 52, upon which the armature is pivotally mounted. The spring is provided with a coil 69 therein, whereby a turning moment will be brought to bear upon the weight, aiding and abetting the same particularly when it is in its raised position, as illustrated in Fig. 1, and in this manner, a substantially uniform turning moment will be exerted by the weight throughout its entire range of movement.

In some instances, it is preferable that the clock be so designed as to accurately operate, even though it be placed in other than a strictly vertical position, and in order to accomplish this, the weight carrying carriage 70 is provided with the thickened and enlarged base plate 71, the center of gravity of which is located upon a line extending through the arbor 26, and at a predetermined angle to the weight carrying arm 42. The relative positions of the weight 44 and the counterbalancing or compensating weight 71 is such, that as diagramatically illustrated in Fig. 7, the summation of the turning moments of the main and counterbalancing weights will be substantially constant throughout a large range of movement. In this connection, attention is called to the diagrammatic view wherein the line "A" represents the turning moment and position of the main or clock actuating weight 44 and the line "B" is plotted in terms of the turning moment and position of the counterbalancing weight 71. From the diagram it will be apparent that the summation of the abscissa will be substantially constant and represented by the line "C", it being noted that the lines "A" and "B" do not represent sine and cosine curves, but have been drawn as straight lines illustrating the substantially constant turning force of the compound clock actuating weights.

A somewhat modified form of the above is disclosed in Fig. 6, wherein the base plate of the carriage is not enlarged, but a separate compensating or counterbalancing weight 72 is provided and is carried by the arm 73 projecting from the weight carrying carriage and located at a predetermined angle with respect to the weight carrying arm 42. A somewhat more modified form of armature and armature carrying member or bracket is disclosed in Fig. 8, wherein the armature 74 is provided with the downwardly turned or extending end 75, which projects below the upper extremities of the magnet cores 47, and is pivotally mounted upon the outstanding post 52. In this manner, the armature is prevented from assuming too great an angle with the two surfaces of the magnet cores 47, and results in the greater efficiency of the magnet and therefore providing for the economical consumption of the electrical energy by means of which the weight is periodically elevated. The armature 74 is provided with the integral upstanding hooked arm 76; in the overturned extremity 77 of which is located the insulated contact point 78. The wire coil 63 is in electrical connection with this contact point, so that when the outstanding lug 67′ of the weight carriage, which is provided with the contact point 79, is raised, due to the lowering of the weight, it will contact with the point 79 and close the electric circuit, resulting in the energization of the magnet and the elevation of the weight. In connection with the foregoing, it is to be noted that as the magnets are energized and the armature attracted, the contact points will be held in electrical connection until the armature is stopped by the abutment block 56. The upward momentum of the weight will then carry the carriage forward to such extent that the electric circuit will be broken, allowing the spring 54 to return the armature to its normally elevated position.

Having thus fully described my invention, what I claim is:—

1. An apparatus of the class described comprising a time-keeping mechanism including a gear train, an arbor adapted to drive said gear train, a compensated weight arrangement mounted on said arbor, and including two spaced weights so supported that lines drawn through the center of gravity of said weights, and through their point of support, extend at an angle one to the other, and thereby provide a substantially uniform turning moment upon said arbor throughout a considerable range of movement of said weights.

2. A time-keeping mechanism comprising a gear train, an arbor adapted to drive said gear train, a member mounted for pivotal motion on said arbor, a weight secured to said member and offset with relation to the axis of said arbor, a second weight carried by said member, offset with relation to the axis of said arbor, and spaced from the first-mentioned weight so that lines drawn through the center of gravity of said weights, and through said arbor, extend at an angle one to the other, said weights adapted to exert a substantially uniform turning moment upon said arbor, and therefore upon said gear train, throughout a considerable range of movement of said weights.

3. A time-keeping mechanism comprising a gear train, an arm mounted for pivotal motion with the center of gravity of said arm removed a distance from the pivotal mounting thereof, said arm adapted to turn through a given arc with a constantly decreasing turning moment, a second arm connected to said first-mentioned arm, and extending at an angle thereto, with the center of gravity thereof spaced a distance from the center of gravity of the first-mentioned arm, and from the pivotal mounting thereof, the second-mentioned arm adapted to turn through an arc corresponding to the above-mentioned arc, with a constantly increasing turning moment, and increasing in a ratio substantially equal to the decreasing turning moment of the first-mentioned arm, to thereby provide a pivotally mounted compensated weight arrangement adapted to exert a substantially uniform turning moment upon said gear train throughout a considerable range of movement of said arms.

Signed at New York, borough of Manhattan, in the county of New York and State of New York this 1st day of February, A. D. 1915.

JOHN COOK.

Witnesses:
ANNA V. WALSH,
GEORGE E. COOK.

Copies of this patent may be obtained for five cents each, by addressing the "Commissioner of Patents, Washington, D. C."